United States Patent [19]

Schwartz

[11] Patent Number: 5,312,633

[45] Date of Patent: * May 17, 1994

[54] METHOD OF MAKING A STUFFED PRETZEL DOUGH PRODUCT AND COMPLETED STUFFED PRETZEL PRODUCT

[76] Inventor: Janet Schwartz, 4353 Frankford Ave., Philadelphia, Pa. 19124

[*] Notice: The portion of the term of this patent subsequent to Feb. 9, 2010 has been disclaimed.

[21] Appl. No.: 13,910

[22] Filed: Feb. 5, 1993

Related U.S. Application Data

[63] Continuation-in-part of Ser. No. 505,798, Apr. 6, 1990, Pat. No. 5,185,167.

[51] Int. Cl.⁵ .......................... A21D 13/00; A23P 1/08
[52] U.S. Cl. ......................................... 426/94; 426/138; 426/283; 426/499; 426/500; 426/503
[58] Field of Search ....................... 426/94, 92, 62, 19, 426/283, 138, 499, 500, 503

[56] References Cited

U.S. PATENT DOCUMENTS

| | | | |
|---|---|---|---|
| 3,976,791 | 8/1976 | Seiberlich | 426/19 |
| 4,251,201 | 2/1981 | Krysiak | 426/94 |
| 4,283,430 | 8/1981 | Doster et al. | 426/94 |
| 4,288,463 | 9/1981 | Groff et al. | 426/500 |
| 4,313,961 | 2/1982 | Tobia | 426/94 |
| 4,400,404 | 8/1983 | Persi | 426/524 |
| 4,661,361 | 4/1987 | Mongiello et al. | 426/94 |
| 4,759,939 | 7/1988 | Keller et al. | 426/499 |
| 4,880,653 | 11/1989 | Keller et al. | 426/499 |

Primary Examiner—Jeanette Hunter
Assistant Examiner—Mary S. Mims

[57] ABSTRACT

A method of making a substantially elongated soft pretzel product from pretzel dough with the end product having an edible filling comprising the steps providing the combination of soft pretzel dough upon which an edible food has been positioned. The soft pretzel combination is formed into a soft pretzel dough product where the edible food is substantially enclosed by the dough. The soft pretzel combination is then baked as desired. Additionally, the combination may be subjected to a coloring agent or a caustic soda solution to provide a desired final appearance.

17 Claims, 4 Drawing Sheets

1. START WITH PRETZEL DOUGH.

2. PRESS DOUGH INTO RECTANGLE.

3. ADD CHEESE AND PEPPERONI.

4. TIGHTLY ROLL LAYERS TOGETHER, STARTING AT SHORT END.

5. PINCH AND SEAL ENDS OF DOUGH.

6. DIP INTO CAUSTIC, THEN SPRINKLE WITH SALT.

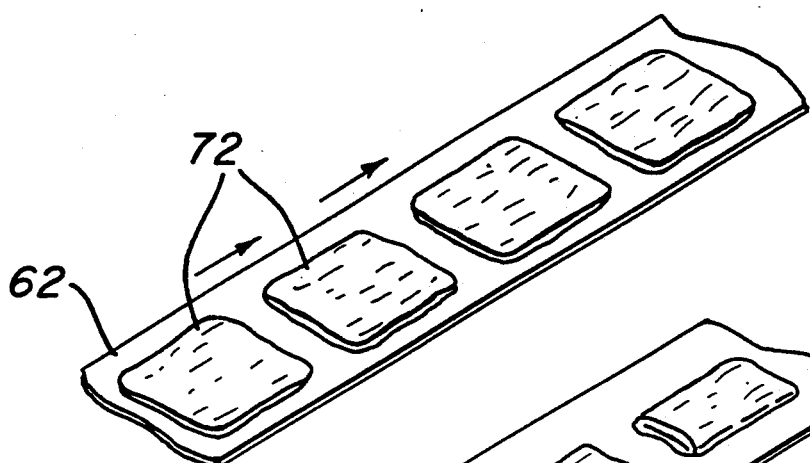
FIG. 10
FIG. 11
FIG. 12
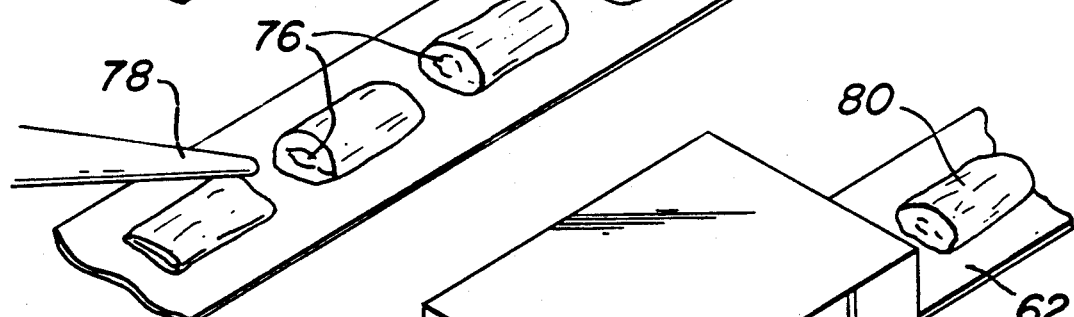
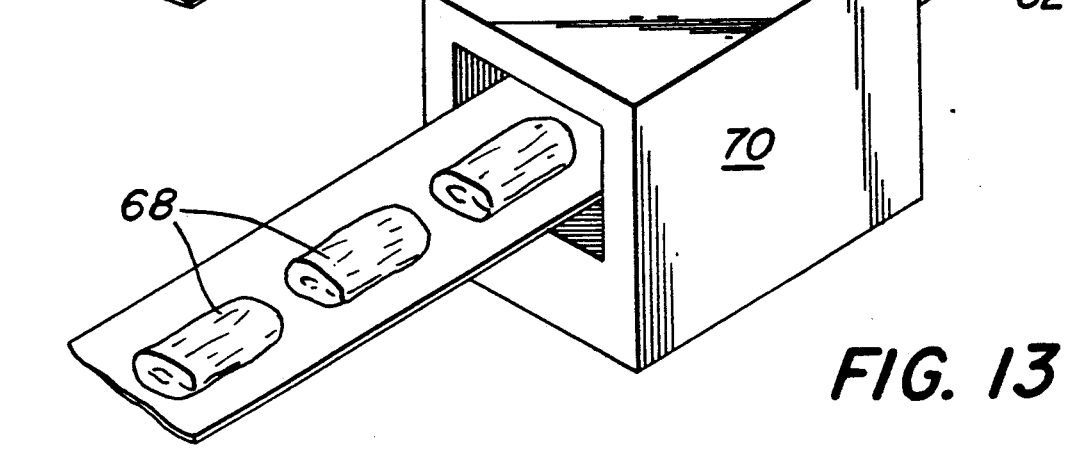
FIG. 13

METHOD OF MAKING A STUFFED PRETZEL DOUGH PRODUCT AND COMPLETED STUFFED PRETZEL PRODUCT

RELATED APPLICATIONS

This application is a continuation-in-part of Ser. No. 505,798, 4/6/90, U.S. Pat. No. 5,185,167, to be issued Feb. 9, 1993, the entire disclosure of which is incorporated by reference herein.

BACKGROUND OF THE INVENTION

This invention relates generally to preparing foodstuffs and more specifically to preparing a hand-shaped, substantially elongated, chewy, soft pretzel dough product and completed soft pretzel product which encloses an edible filling material such as meat, cheese and/or other foods.

There are basically two distinct types of pretzels. These may be designated as the soft pretzel, which is intended to be eaten the same day it is baked, and the hard pretzel, which may be stored and eaten at a much later time without losing its general qualities.

Pretzel characteristics are dependent upon a number of factors, including the variety of ingredients and method of manufacture and storage. A variety of flours may be used to make pretzel dough, such as patent, straight and clear flours, and pretzels may be made with and without shortening.

Pretzels are made in a variety of sizes and shapes. Some are machine-stamped and others are shaped by hand or by machine. Machine-made pretzels are generally made in smaller sizes and may be in the form of the ordinary twisted variety or in sticks, etc. Handmade pretzels however, are usually made in larger sizes than the machine-stamped variety and may take a variety of shapes depending upon the method of shaping.

A high quality pretzel generally has a pleasing flavor, a smooth, glossy yellow-brown outside appearance, a white inside appearance and a texture which facilitates mastication without the product "doughing" in the mouth. A high quality stuffed pretzel additionally, should retain its edible filling for ease of handling and consumption.

Several methods of making a wide variety of pretzels are described in Technical Bulletin 46, from the U.S. Dept. of Agriculture, Washington, DC (November 1927).

Methods for making stuffed pretzels have suffered from several drawbacks, most notably, they produce a product which is oftentimes soggy and unappetizing due to the moisture content of the various fillings used. Additionally, previous methods suffered from the defect of the pretzel filling being exposed to the caustic soda solution when the pretzel was dipped prior to baking, which resulted in an inedible product. This result was oftentimes due to deficient prior methods of forming and shaping the pretzel which caused the pretzel to come apart during the manufacture thereof.

Patents disclosing methods of making hand-held edible foods which are oftentimes filled, are those disclosed in U.S. Pat. No. 4,608,259 (Cortopossi), U.S. Pat. No. 4,725,444 (Wilkins), U.S. Pat. No. 4,741,908, and U.S. Pat. No. 4,795,652 (Cooper).

Prior to the method and product of the present invention, there has not been a fast and inexpensive method of producing a hand-held, appetizing, and consistent stuffed pretzel product with a variety of edible fillings.

OBJECTS OF THE INVENTION

Accordingly, it is a general object of this invention to provide a method of making a soft pretzel product which is simple and yet produces an appetizing foodstuff which contains an edible filling material.

It is a further object of this invention to provide a method of making a soft pretzel product which is easy to hold while being consumed.

It is still a further object of this invention to provide a method for making an aesthetically pleasing soft pretzel product.

It is yet still a further object of this invention to provide a method for making a soft pretzel product which may be chilled or frozen without affecting its appearance or taste.

It is still a further object of this invention to provide a method for making a soft pretzel product which is chewy and facilitates mastication.

SUMMARY OF THE INVENTION

These and other objects of this invention are achieved by providing a method of making a substantially elongated soft pretzel product from pretzel dough with the combination end product having an edible filling. The method comprises the steps of providing the soft pretzel dough and an edible filling material. The edible filling material is enveloped within the soft pretzel dough either manually or by machine to form the combination and the combination is then baked at an appropriate temperature. Additionally, prior to baking the combination, it may be subjected to a coloring agent or other color producing agent, such as caustic, to provide a pleasing color to the soft pretzel product.

DESCRIPTION OF THE DRAWINGS

Other objects and many attendant features of this invention will become readily appreciated as the same becomes better understood by reference to the following detailed description when considered in connection with the accompanying drawings wherein:

FIG. 10 is a side view of several portions of pretzel dough on a conveyor in the preparation of a stuffed pretzel product in accordance with a third method of the present invention.

FIG. 11 is a side view of the portions of pretzel dough prior to filling of the interior cavity of the portions with an edible filling material.

FIG. 12 is a side view of the portions of pretzel dough being filled with edible filling material.

FIG. 13 is a side view of the portions entering and exiting an oven used for baking the stuffed pretzel.

DETAILED DESCRIPTION OF THE PREFERRED EMBODIMENTS

Figure 1:
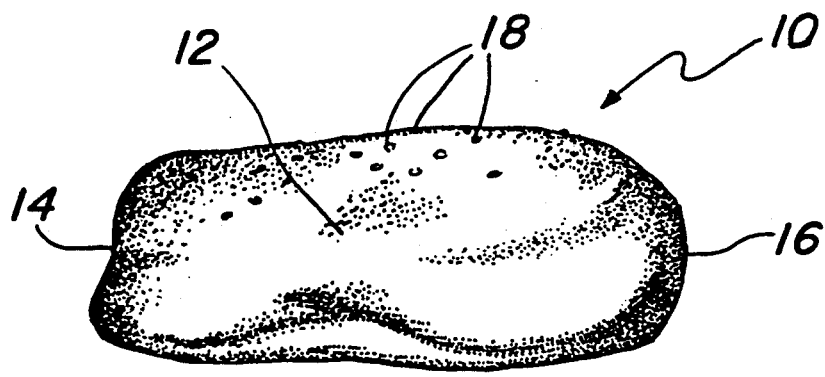
FIG. 1 is a side view of a completed stuffed pretzel product made in accordance with the method of the present invention.
Figure 2:
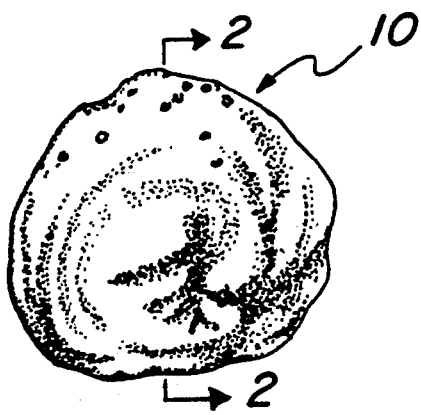
FIG. 2 is an end view of a completed stuffed pretzel product made in accordance with the method of the present invention.

Referring now to various figures of the drawings where like reference numerals refer to like parts there is shown at 10 in FIGS. 1 and 2, a completed pretzel dough product in accordance with the method of the present invention. As can be seen clearly in FIG. 1, the pretzel 10 is substantially elongated with a generally cylindrical cross-section and has a longitudinal axis 12, and two ends 14 and 16. Additionally, the product 10 may have crystallized salt 18 on its exterior surface.

Figure 3:
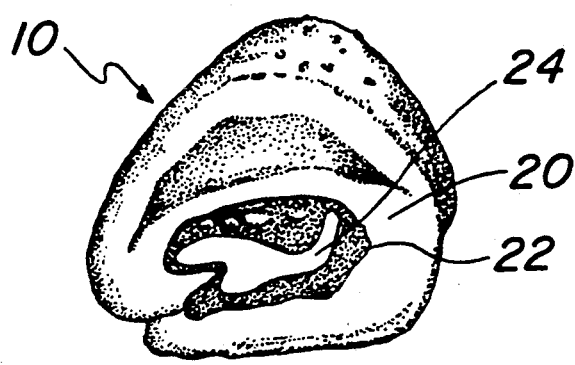
FIG. 3 is a cross sectional view of a completed stuffed pretzel product made in accordance with the method of the present invention taken along line 2—2.

As shown more clearly in FIG. 3, the completed pretzel product 10 has an edible filling 20 comprising meat 22 and/or cheese 24.

Figure 4A:
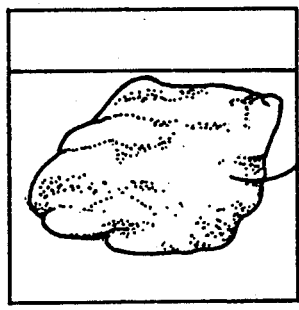
FIG. 4A through 4F show the steps in making a completed stuffed pretzel product in accordance with the method of the present invention.

As shown in FIGS. 4A through 4F, the method of the present invention comprises a series of steps. In order to prepare the pretzel dough 40, the baker thoroughly mixes the ingredients (not shown) in the following proportions: approximately .100 pounds of a high gluten flour such as clear spring flour, approximately 1 pound of yeast and approximately 6 gallons of water. Although other types of flour may be used, it is preferable to use clear spring flour to provide the finished product with the desired chewy texture and consistency. After the dough 40 is formed, it may be kneaded or rolled into a generally continuous sheet as shown in FIG. 4A, to a approximate thickness of about ⅛" to ⅜." This thickness is desirable to facilitate folding and shaping of the product into its finished form.

Figure 4B:
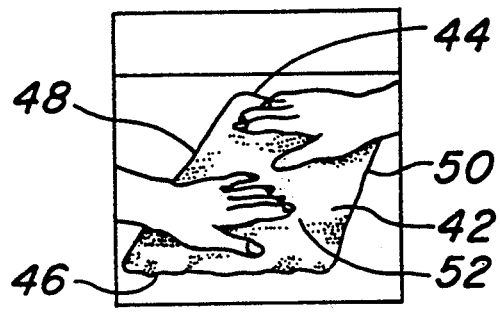

As shown in FIG. 4B, the baker then cuts and/or presses the sheet of dough into a piece 42 having a weight of approximately 3 ounces, which is substantially rectangular in shape and has a top end 44 substantially parallel to bottom end 46 and two substantially parallel sides 48 and 50.

The baker then places approximately 1.5 ounces of the edible filling material 2 substantially in the center 52 of the piece of dough 40. The filling preferably comprises meat 22 and/or cheese 24 and/or other foodstuffs (not shown). In order to prevent the finished product from being soggy, it is preferable to use filling materials which have a low moisture content, such as pepperoni, ham and/or cheeses such as mozzarella, provolone, and any other suitable cheese.

Figure 4C:
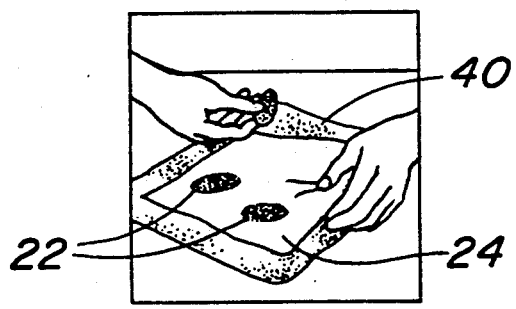
Figure 4D:
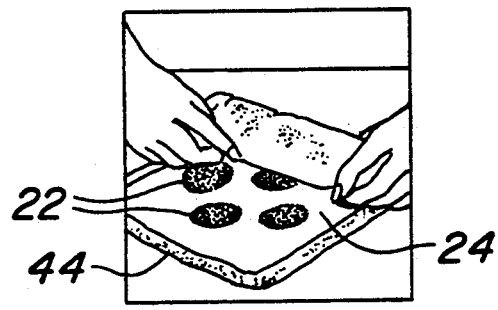

As shown more clearly in FIGS. 4C and 4D, once the filling 20 is placed on the dough 40, the bottom end 46 of the piece 40 is folded over the edible filling material 20 so that the top end 44 of the piece 40 forms a flap approximately 1" wide (not shown) and the edible filling material is substantially enclosed therein. Alternatively, the piece 40 may be rolled without forming a flap, to utilize all of the piece 40 in the finished product 10 to minimize waste.

Figure 4E:
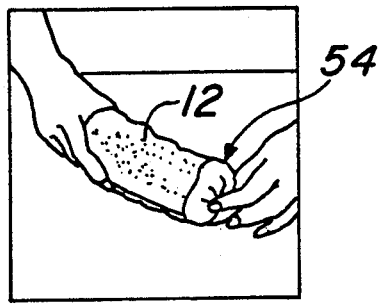

In order to seal the piece 40 along its longitudinal axis 12, it is preferable that the baker press the bottom end 46 of the piece of dough 40 to fixedly secure the bottom end 46 to the piece 40 to prevent the dough from unrolling. If a flap is formed, it is necessary to trim away any excess of the flap which extends beyond the generally cylindrical piece of dough. As shown in FIG. 4E, the baker secures each of the two ends 48 and 50 of the piece 40 to enclose the edible filling material 20 within the piece. The baker may do so by pinching each of the ends 48 and 50 together with his/her fingers, after having tucked inside any loose filling material 20. It is vital that the dough completely seal the filling 20 and create a closed environment, to prevent any caustic soda solution 56 from entering into the pretzel interior. If this occurs, the pretzel product is inedible.

Figure 4F:
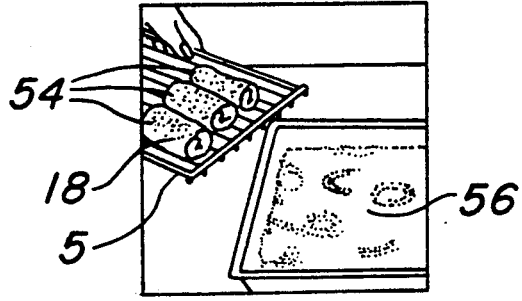
Figure 5:
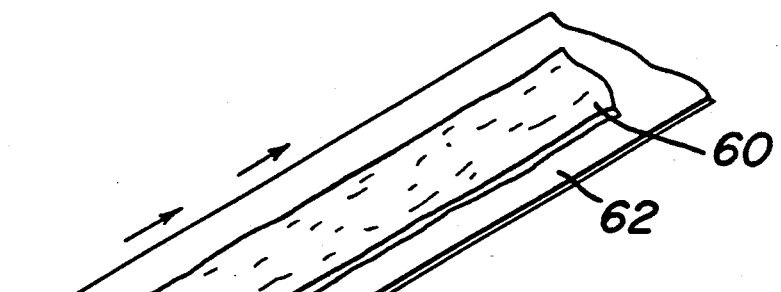
FIG. 5 is a side view of a strip of dough on a conveyor or other surface in the preparation of a stuffed pretzel product in accordance with a second method of the present invention.

The generally cylindrically shaped unbaked product 54 is then refrigerated for a time period in the range of 4 to 24 hours at a temperature in the range of 35° F. to 40° F. to form a partial crust on the exterior of the dough which assists in forming the crusty surface upon baking. Refrigeration also retards the raising of the dough which further aids in providing the desired texture and consistency, but is not necessary, e.g., proofing of the pretzel dough (raising of the dough) instead. As shown in FIG. 4F, the unbaked pretzel 54 is then dipped in a conventional caustic soda solution 56 to provide the finished product with the typical pretzel glaze and brown color after baking. Alternatively, the unbaked pretzel 54 may be dipped or sprayed with conventional coloring means, such as a coloring agent, to provide the finished product with a desirable, pleasing color, e.g., the brownish color typical to pretzels, or any other color, e.g, green for various holidays, etc. If desired, the unbaked pretzel 54 is then sprinkled with crystallized salt 18 (sodium chloride) prior to baking.

The unbaked pretzel 54 is placed on a baking sheet, tray or rack 58, and then baked in an oven (not shown) at a temperature of approximately 550° F. for a time period in the range of 8 to 10 minutes. It is preferable that the pretzels be baked in an oven having a brick hearth to provide even and constant heat, although any suitable oven may be utilized. Alternatively, other forms of cooking may be utilized. For example, if a coloring agent is utilized in place of the caustic solution, the pretzel may be cooked in a convection or microwave oven.

After cooling, the completed pretzel is ready to be eaten or may be frozen. The generally cylindrical shape aids in the hand held consumption of the pretzel in awkward situations such as on the street, in a sports arena or concert, or any time when utensils are undesired or unavailable.

Alternatively, the edible filling material may be enveloped by the soft pretzel dough to form the combination in a wide variety of ways and shapes, either manually or by machinery used to form various types of edible products.

A second method of the present invention will now be described with reference to FIGS. 5-9. The baker prepares the dough to be used either in accordance with the method previously set forth, or in accordance with any other suitable recipe for the making of a dough to be utilized in the preparation of an edible stuffed pretzel product. Accordingly, after the dough is prepared, it is shaped into a generally elongated piece 60 or sheet or any other desired shape and is placed on a surface, such as a conveyor 62 for further processing.

As described above the elongated piece has an approximate thickness of about ⅛" to ⅜." This thickness is desirable to facilitate folding and shaping of the product into its finished form, however, the invention should not be so limited to such a dimension and other thicknesses may be utilized depending upon the characteristics of the desired endproduct.

Figure 6:
FIG. 6 is a side view of the strip of dough on a conveyor having several portions of edible filling material placed in areas of the dough.

As shown in FIG. 6, the edible filling material 64 is placed onto the elongated piece 60 as desired, in either discrete portions or in one continuous length. The edible filling material 64 may be any of the previously described types of materials, or may be almost any other suitable type of edible filling material not mentioned above.

Figure 7:
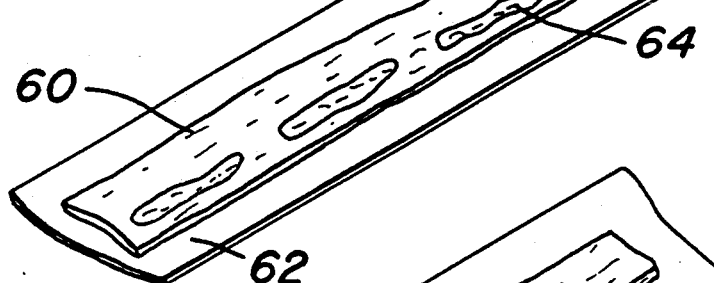
FIG. 7 is a side view of the strip of dough containing the edible filling material wherein the edible filling material is substantially enveloped by the dough.

In FIG. 7 is shown the enveloping of the edible filling material 64 by the elongated piece 60 which may be accomplished by folding, turning, rolling, or any other suitable means or step to form the elongated uncooked pretzel 66. If desired, the ends of the uncooked pretzel 66 are crimped or cut (not shown) for trimming purposes or to firmly secure the dough ends to one another. However, this step is not necessary if the size of the elongated piece is as desired or if the step enveloping of the edible filling material also adequately secures the filling material within the elongated piece.

Figure 8:
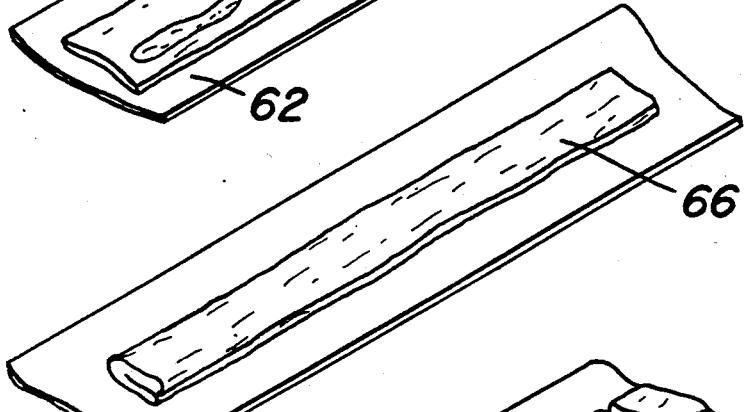
FIG. 8 is a side view of the filled strip of dough cut into distinct portions prior to baking.
Figure 9:
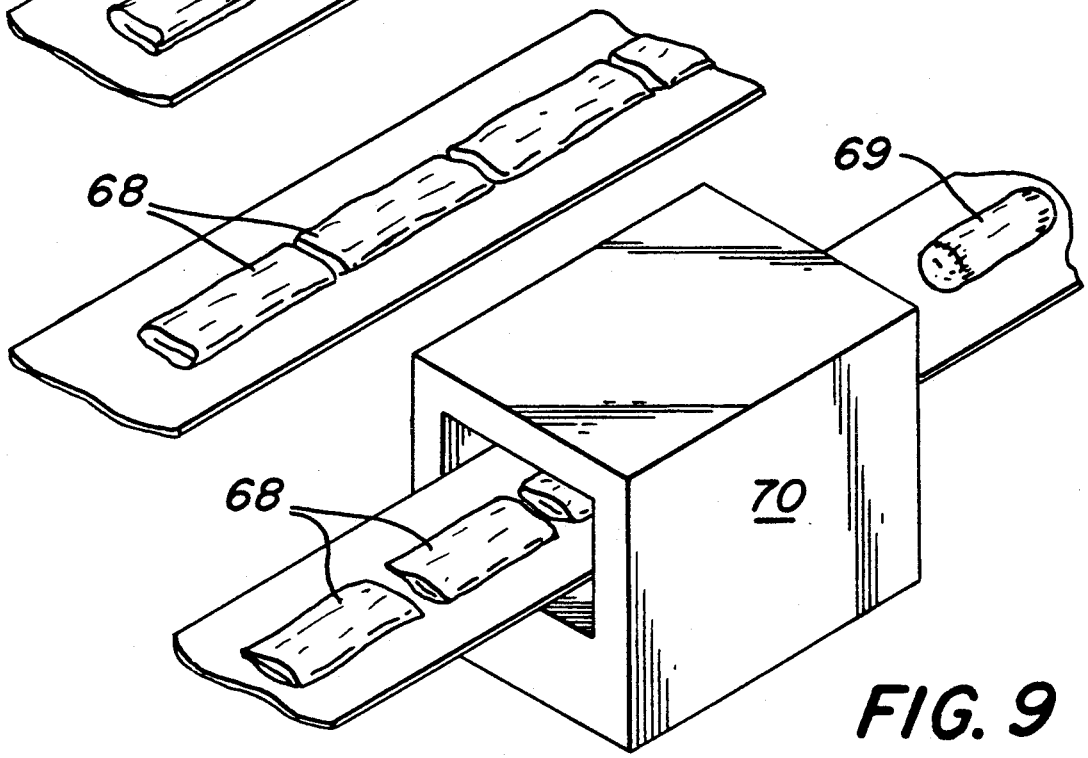
FIG. 9 is a side view of the portions entering and exiting an oven used for baking the stuffed pretzel.

Thereafter, as shown in FIG. 8, the uncooked pretzel 66 may be cut into the desired individual pretzel pieces or lengths 68, which may be of any desired length. The step of cutting adequately secures the ends of each individual piece together, however if one desires, the baker may also crimp or press down on each of the ends of the pieces 68 to more securely form the pieces.

Depending upon the type of dough product utilized, the generally cylindrically shaped unbaked product 54 may then refrigerated (not shown) for a time period in the range of 4 to 24 hours at a temperature in the range of 35° F. to 40° F. to form a partial crust on the exterior of the dough which assists in forming the crusty surface upon baking. Refrigeration also retards the raising of the dough which further aids in providing the desired texture and consistency if desired.

Thereafter, if desired, the unbaked pretzel 66 is dipped in a conventional caustic soda solution (not shown) to provide the finished product with the typical pretzel glaze and brown color after baking. Alternatively, the unbaked pretzel 66 may be dipped or sprayed (not shown) with conventional coloring means, such as a coloring agent, to provide the finished product with a desirable, pleasing color, e.g., the brownish color typical to pretzels, or any other color, e.g, green for various holidays, etc.

If desired, the unbaked pretzel 66 is then sprinkled with crystallized salt (e.g., sodium chloride)(not show) prior to baking.

The unbaked pretzel 66 is then baked in an oven 70 at a temperature of approximately 550° F. for a time period in the range of 8 to 10 minutes to produce the stuffed pretzel product 69. The temperature and time period of baking will vary depending upon the circumstances of use, e.g., the type of filling and dough, the thicknesses of each, etc., and the present invention should not be so limited.

It is preferable that the pretzels be baked in an oven having a brick hearth to provide even and constant heat, although any suitable oven may be utilized. Alternatively, other forms of cooking may be utilized. For example, if a coloring agent is utilized in place of the caustic solution, the pretzel may be cooked in a convection or microwave oven.

A third method of the present invention is shown in FIGS. 10-13. As shown in FIG. 10, a plurality of dough pieces 72 in the desired configuration are placed on a conveyor or other suitable surface 62. Depending upon the desired characteristics of the endproduct, the shape and size of the dough pieces 72 may be varied.

As shown in FIG. 11, the dough pieces 72 are then shaped or folded as desired, prior to filling with an edible filling material into the desired unbaked dough piece 74. Either simultaneously, or thereafter, as shown in FIG. 12, an edible filling material 76 may be placed within the cavity (not shown) of the unbaked dough piece 74, either by a conventional filling nozzle 78, manually or by any other desired means known to those skilled in the art. If desired, the ends of each individual dough piece 74 are crimped or pressed down to retain the edible filling within the dough piece. Although this is an important step if a caustic solution is used to color the pretzel product, this step is not necessary if a coloring agent is sprayed or otherwise applied to the exterior surface of the unbaked pretzel as previously described.

Thereafter, as previously described, and as shown in FIG. 13, the unbaked stuffed pretzel 68, may be dipped in caustic, having a coloring agent salt applied and is baked in the oven 70 or other apparatus for the desired time at the appropriate conditions to complete the stuffed pretzel product 80.

After cooling, the completed pretzel is ready to be eaten or may be frozen. The generally cylindrical shape aids in the hand held consumption of the pretzel in awkward situations such as on the street, in a sports arena or concert, or any time when utensils are undesired or unavailable.

Without further elaboration the foregoing will so fully illustrate my invention that others may, by applying current or future knowledge, readily adapt the same for use under various conditions of service.

I claim:

1. A method of making a soft pretzel dough product from pretzel dough having an edible filling material therein, the method comprising the steps of:
   (a) providing the combination of soft pretzel dough upon which an edible food has been positioned;
   (b) forming the soft pretzel combination into a soft pretzel dough product where the edible food is substantially enclosed by the dough; and
   (c) baking the soft pretzel combination.

2. The method of claim 1 additionally comprising the step of refrigerating the soft pretzel combination for a time period in the range of 4 to 24 hours at a temperature in the range of 35° F. to 40° F. prior to baking.

3. The method of claim 1 additionally comprising subjecting the soft pretzel combination to a means for coloring the combination.

4. The method of claim 3 additionally comprising selecting the means for coloring to comprise dipping the combination in a caustic soda solution.

5. The method of claim 3 additionally comprising selecting the means for coloring to comprise subjecting the combination to a coloring agent.

6. The method of claim 1 additionally comprising selecting the baking step to occur at a temperature of approximately 550° F. for a time period in the range of 8 to 10 minutes.

7. The method of claim 1 additionally comprising selecting the edible filling material to comprise meat and cheese.

8. The method of claim 1 additionally comprising selecting the edible filling material to comprise cheese.

9. The method of claim 1 additionally comprising selecting the forming step to occur by a method selected from the group consisting of hand forming and machine forming.

10. An elongated stuffed pretzel food product comprising soft pretzel dough and an edible filling material, the dough comprising flour.

11. An elongated stuffed pretzel food product comprising soft pretzel dough and edible filling material, the dough comprising spring flour, yeast and water, the edible filling material comprising cheese.

12. The pretzel of claim 10 wherein the composition of the pretzel dough comprises approximately 100 pounds of spring flour, approximately 1 pound of yeast and approximately 6 gallons of water.

13. The pretzel of claim 11 wherein the composition of the pretzel dough comprises approximately 100 pounds of spring flour, approximately 1 pound of yeast and approximately 6 gallons of water.

14. The pretzel of claim 10 wherein the spring flour is clear spring flour.

15. The pretzel of claim 11 wherein the spring flour is clear spring flour.

16. A method of making a soft pretzel dough product from pretzel dough having an edible filling material therein, the method comprising the steps of:
  (a) providing the combination of soft pretzel dough and a edible filling material;
  (b) forming the soft pretzel combination into a soft pretzel dough product where the edible food is substantially enclosed by the dough; and
  (c) baking the soft pretzel combination.

17. A new use for soft pretzel dough comprising:
  (a) providing the combination of soft pretzel dough upon which an edible food has bee positioned;
  (b) forming the soft pretzel combination into a soft pretzel dough product where the edible food is substantially enclosed by the dough; and
  (c) baking the soft pretzel combination.

* * * * *

US005312633C1

(12) EX PARTE REEXAMINATION CERTIFICATE (5926th)
United States Patent
Schwartz

(10) Number: US 5,312,633 C1
(45) Certificate Issued: Oct. 9, 2007

(54) METHOD OF MAKING A STUFFED PRETZEL DOUGH PRODUCT AND COMPLETED STUFFED PRETZEL PRODUCT

(76) Inventor: Janet Schwartz, 4353 Frankford Ave., Philadelphia, PA (US) 19124

Reexamination Request:
No. 90/004,933, Mar. 2, 1998

Reexamination Certificate for:
Patent No.: 5,312,633
Issued: May 17, 1994
Appl. No.: 08/013,910
Filed: Feb. 5, 1993

Related U.S. Application Data

(63) Continuation-in-part of application No. 07/505,798, filed on Apr. 6, 1990, now Pat. No. 5,185,167.

(51) Int. Cl.
*A21D 13/00* (2006.01)

(52) U.S. Cl. .................. 426/94; 426/138; 426/283; 426/499; 426/500; 426/503

(58) Field of Classification Search ................ None
See application file for complete search history.

(56) References Cited

U.S. PATENT DOCUMENTS

| | | |
|---|---|---|
| 3,976,791 A | 8/1976 | Seiberlich |
| 4,251,201 A | 2/1981 | Krysiak |
| 4,283,430 A | 8/1981 | Doster et al. |
| 4,288,463 A | 9/1981 | Groff et al. |
| 4,313,961 A | 2/1982 | Tobia |
| 4,400,404 A | 8/1983 | Persi |
| 4,608,259 A | 8/1986 | Cortopassi |
| 4,661,361 A | 4/1987 | Mongiello et al. |
| 4,725,444 A | 2/1988 | Wilkins |
| 4,741,908 A | 5/1988 | Brooks et al. |
| 4,759,939 A | 7/1988 | Keller et al. |
| 4,795,652 A | 1/1989 | Cooper |
| 4,803,084 A * | 2/1989 | Shine ................... 426/20 |
| 4,880,653 A | 11/1989 | Keller et al. |

OTHER PUBLICATIONS

Gail Povin, "Frozen Food Goes Upscale", Oct. 28, 1987.*
Product Alert, Stuffin 'Pretzels with Spinach N' Cheese, Nov. 1988.*
Philadephia Daily News, Philly's Favorite Twist–Pretzels, p. 51, Dec. 1983.*
Technical Bulletin.
Baker's Helper.
Rheon Machinery.
Two Firms Test.
Super Market Business Jun. 1987.
Snack Food, Feb. 1983.
Bakery, Mar. 1981.
Milling and Baking News.
The Confectioner.
Pretzel Frank.
Stuffin' Pretzel Materials.
Pretzel Dogs.
Stuffin' Pretzel Package—3 pieces.
Stein Declarations attachment.
Christine Holtz Declaration attachment.

* cited by examiner

*Primary Examiner*—Lien Tran

(57) ABSTRACT

A method of making a substantially elongated soft pretzel product from pretzel dough with the end product having an edible filling comprising the steps providing the combination of soft pretzel dough upon which an edible food has been positioned. The soft pretzel combination is formed into a soft pretzel dough product where the edible food is substantially enclosed by the dough. The soft pretzel combination is then baked as desired. Additionally, the combination may be subjected to a coloring agent or a caustic soda solution to provide a desired final appearance.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–17 are cancelled.

\* \* \* \* \*